(12) United States Patent
Walker et al.

(10) Patent No.: US 8,167,708 B2
(45) Date of Patent: *May 1, 2012

(54) METHOD AND APPARATUS FOR PROVIDING CREDITS FOR GAME PLAY

(75) Inventors: Jay S. Walker, Ridgefield, CT (US); James A. Jorasch, Stamford, CT (US); Scott T. Friesen, Stamford, CT (US); Geoffrey M. Gelman, Stamford, CT (US); Norman A. Goldstein, Scarsdale, NY (US); Dean P. Alderucci, Stamford, CT (US)

(73) Assignee: IGT, Reno, NV (US)

( * ) Notice: Subject to any disclaimer, the term of this patent is extended or adjusted under 35 U.S.C. 154(b) by 666 days.

This patent is subject to a terminal disclaimer.

(21) Appl. No.: 12/349,078

(22) Filed: Jan. 6, 2009

(65) Prior Publication Data

US 2010/0174600 A1 Jul. 8, 2010

Related U.S. Application Data

(63) Continuation of application No. 10/175,232, filed on Jun. 18, 2002, now Pat. No. 7,473,177.

(60) Provisional application No. 60/299,015, filed on Jun. 18, 2001.

(51) Int. Cl.
*A63F 9/24* (2006.01)
(52) U.S. Cl. ........................................ 463/25
(58) Field of Classification Search ............... 463/16–25
See application file for complete search history.

(56) References Cited

U.S. PATENT DOCUMENTS

| | | |
|---|---|---|
| 5,055,657 A | 10/1991 | Miller et al. |
| 5,080,364 A | 1/1992 | Seidman |
| 5,274,561 A | 12/1993 | Adams et al. |
| 5,394,332 A | 2/1995 | Kuwahara et al. |
| 5,466,010 A | 11/1995 | Spooner |
| 5,800,268 A | 9/1998 | Molnick |
| 5,865,470 A | 2/1999 | Thompson |
| 5,928,082 A | 7/1999 | Clapper, Jr. et al. |
| 6,113,495 A | 9/2000 | Walker et al. |
| 6,144,948 A | 11/2000 | Walker et al. |
| 6,193,608 B1 | 2/2001 | Walker et al. |
| 6,289,315 B1 | 9/2001 | Calvi |
| 6,456,207 B1 | 9/2002 | Yen |
| 6,500,067 B1 | 12/2002 | Luciano et al. |
| 6,511,377 B1 | 1/2003 | Weiss |
| 6,520,542 B2 | 2/2003 | Thompson et al. |
| 6,582,310 B1 | 6/2003 | Walker et al. |
| 6,636,156 B2 | 10/2003 | Damiani et al. |
| RE38,733 E | 5/2005 | Walker et al. |

(Continued)

OTHER PUBLICATIONS

Casino Heat—Get $100 in Casino Cash!; Advertisement; Link2buy; Jun. 13, 2003 (1 page).

Alliance Gaming Announced Regulatory Approvals for SDS(R) Coupon (TM), SDS Ticket Cashiering (TM); PR Newswire, Financial News Section, Jul. 9, 2002 (2 pages).

(Continued)

*Primary Examiner* — Omkar Deodhar
(74) *Attorney, Agent, or Firm* — K&L Gates LLP

(57) ABSTRACT

Systems and methods are provided for offering a voucher which is redeemable for credits at a casino. The voucher may be redeemed for a first value of credits. One is charged a second value for the voucher, in which the second value is less than the first value. If the person is purchasing an additional product or service, the person may also be charged a reduced price for that product.

20 Claims, 6 Drawing Sheets

U.S. PATENT DOCUMENTS

| | | |
|---|---|---|
| 7,241,219 B2 | 7/2007 | Walker et al. |
| 7,473,177 B2 * | 1/2009 | Walker et al. ............... 463/25 |
| 7,871,327 B2 | 1/2011 | Walker et al. |
| 2002/0177479 A1 | 11/2002 | Walker et al. |

OTHER PUBLICATIONS

Banking on the FLAGSHIP; International Gaming and Wagering Business; Nov. 27, 1996 (2 pages).

* cited by examiner

METHOD AND APPARATUS FOR PROVIDING CREDITS FOR GAME PLAY

PRIORITY CLAIM

This application is a continuation of U.S. patent application Ser. No. 10/175,232, entitled "METHOD AND APPARATUS FOR PROVIDING CREDITS FOR GAME PLAY", filed on Jun. 18, 2002 and issued on Jan. 6, 2009 as U.S. Pat. No. 7,473,177, which claims priority to and the benefit of U.S. Provisional Patent Application Ser. No. 60/299,015, filed on Jun. 18, 2001, the entire contents of which is incorporated herein by reference.

BACKGROUND

The present invention relates to games of chance.

Casinos and other entities permit players to play games of chance, such as poker, blackjack, keno and slot machines. Some games are table based, such as a table game of poker or blackjack, and others are played using devices, such as slot machines, video poker machines, video blackjack machines and keno machines. Such games typically involve a monetary wager, where a player may win funds in the form of cash, chips, or other monetary forms.

In such games, the "house" (i.e. the entity running the games and/or profiting from the games) typically has a statistical advantage even if players employ optimal or perfect game playing strategies. Thus, for large numbers of plays, the house has an expected range of won funds per play, depending on the game and possibly depending on other factors as well.

Accordingly, the house would like to promote play of games of chance.

DETAILED DESCRIPTION OF THE INVENTION

Applicants have recognized that various manners of selling credits can promote play of games of chance, where those credits may be used in playing the games of chance.

Applicants have also recognized that, in some embodiments, selling credits outside of a casino can be advantageous.

Applicants have also recognized that, in some embodiments, selling casino credits at a discount can attract an otherwise indifferent player (e.g., in a taxicab without a specific destination) to play at a specific casino.

Applicants have also recognized that, in some embodiments, selling casino credits at a discount can attract a player who is not indifferent, but who could be persuaded to play at another casino than one he originally desired to attend.

Applicants have also recognized that, in some embodiments, if credits can be purchased at a location frequented after game play (e.g. a casino restaurant) then the purchaser may be more likely to return to play.

The following description is organized into the following sections: voucher offering, reconciliation, voucher use and compensation. These section names are merely illustrative and are only provided for ease of reference; they do not denote the limits of what is described in each respective section.

Certain products and processes which are well known in the art and which are not necessary to describe or enable the practice of the embodiments of the present invention are not described in detail herein for simplicity and clarity.

Voucher Offering

Figure 1:
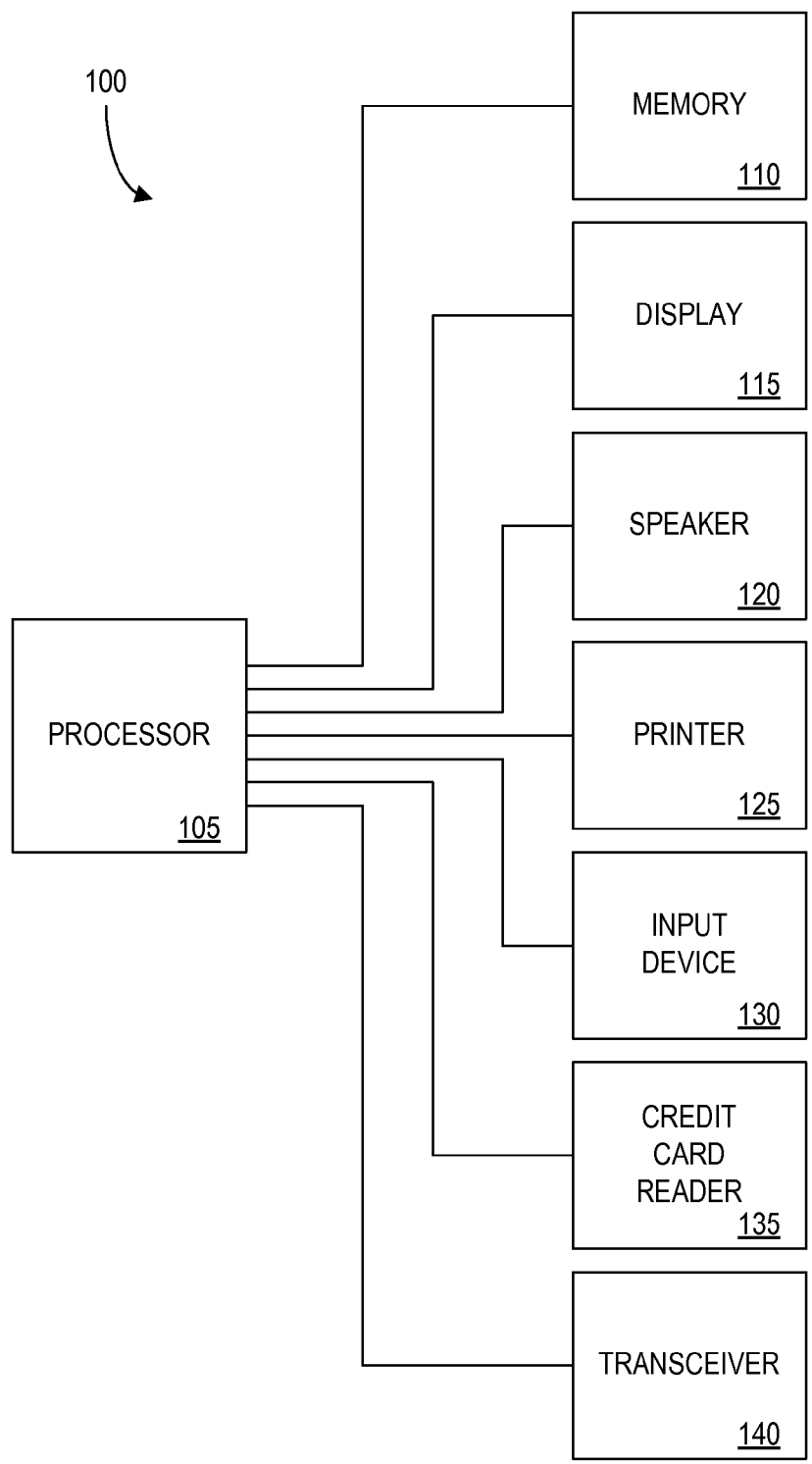
FIG. 1 is a schematic illustration of a system provided in accordance with an embodiment of the present invention.

FIG. 1 illustrates a system 100 provided in accordance with an embodiment of the present invention. The system 100 includes a processor 105, which may be one or more microprocessors, microcontrollers and/or other devices for controlling other components of the system 100. The processor 105 may be, for example, a microprocessor from the INTEL® PENTIUM® family.

The processor 105 is in communication with a memory 110, which may be any appropriate combination of semiconductor, optical and magnetic memory. For example, the memory 110 may be a combination of DRAM (Dynamic Random Access Memory) and a ROM (Read Only Memory). Those of ordinary skill in the art will readily understand how to configure memory 110. Those of ordinary skill in the art will further understand that if memory 110 is implemented as a plurality of components those components may or may not communicate with each other. The memory 110 may be directed by the processor 105 to store data, and/or the processor may also retrieve data stored in the memory.

The processor 105 and the memory 110 may each be, for example: (i) located entirely within a single computer or other computing device; or (ii) connected to each other by a remote communication medium, such as a serial port cable, telephone line or radio frequency transceiver.

The memory 110 stores a program for controlling the processor 105 in a manner known in the art. The processor 105 performs instructions of the program, and thereby operates in accordance with embodiments of present invention, and particularly in accordance with methods described in detail herein. The program may be stored in a compressed, uncompiled and/or encrypted format. The program furthermore includes program elements that may be necessary, such as an operating system, a database management system and/or "device drivers" for allowing the processor 105 to interface with various peripheral devices/components. Appropriate program elements are known to those skilled in the art, and need not be described in detail herein.

According to an embodiment of the present invention, the instructions of the program 240 may be read into a main memory from another computer-readable medium, such from a ROM to RAM. Execution of sequences of the instructions in program 240 causes processor 105 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The processor 105 is in communication with a display 115. The display 115 may be any device or combination of devices that display information visually. The display 115 may comprise, for example, a monitor, LEDs (light emitting diodes), liquid crystal displays or plasma screens. The display 115 may be directed by the processor to display a variety of text and graphical images.

The processor 105 is in communication with a speaker 120. The speaker 120 may be any device or combination of devices that output sound. The speaker 120 may be directed by the processor 105 to produce a wide variety of sounds in a manner known in the art. For example, the memory 110 may store data which represents a sound, such as set of data in ".WAV" file format. The processor 105 may retrieve this data from the memory 110 and use the data to drive the speaker 120 in a manner known in the art.

The processor 105 is in communication with a printer 125. The printer 125 may be any device or combination of devices that register indicia onto a substrate such as paper. The printer 125 may, for example, register indicia onto paper using ink jet or laser deposition, in a manner known in the art. The printer 125 may be directed by the processor 105 to register a wide variety of indicia, including text and images, onto a substrate in a manner known in the art.

The processor 105 is in communication with an input device 130. The input device 130 may be any device or combination of devices that is capable of receiving input, from a human and/or from another device. The input device 130 may comprise, for example, buttons or a touch screen. The input device 130 may forward information, such as data representing button presses, to the processor 105 in a manner known in the art.

The processor 105 is in communication with a credit card reader 135. The credit card reader 135 is capable of reading data, typically data that is stored on magnetic strips of cards which are "swiped" or passed through a portion of the credit card reader 135 that is capable of reading such magnetic strips. A variety of devices capable of performing the functions of the credit card reader 135 are known in the art. The credit card reader 135 transmits data read from a credit card to the processor 105. The processor 105 may use that data in a variety of financial transactions and identification transactions.

The processor 105 is in communication with a wireless transceiver 140. The transceiver 140 may be any device or devices capable of transmitting information wirelessly and/or receiving information wirelessly. For example, wireless transceiver 140 may transmit and/or receive infrared signals, radio frequency signals, electromagnetic signals, in any appropriate format or protocol. Wireless transmission and reception of information is known in the art, as are devices for wireless transmission and reception, and wireless transmission formats and protocols. The wireless transceiver 140 may be directed by the processor 105 to transmit information wirelessly, for example, to a remote receiver which stores and/or processes that information. Similarly, the wireless transceiver 140 may transmit to the processor 105 information received via wireless transmission.

The system 100 may be implemented as one or more devices. For example, the system 100 may be housed in a housing (not shown in FIG. 1) such as a plastic case. Alternatively, portions of the system 100 may be housed in a single housing while others are in separate devices, perhaps located remotely.

The system 100 depicted in FIG. 1 is only one embodiment of the invention. Other embodiments of the invention do not include various components illustrated in FIG. 1.

Figure 2:
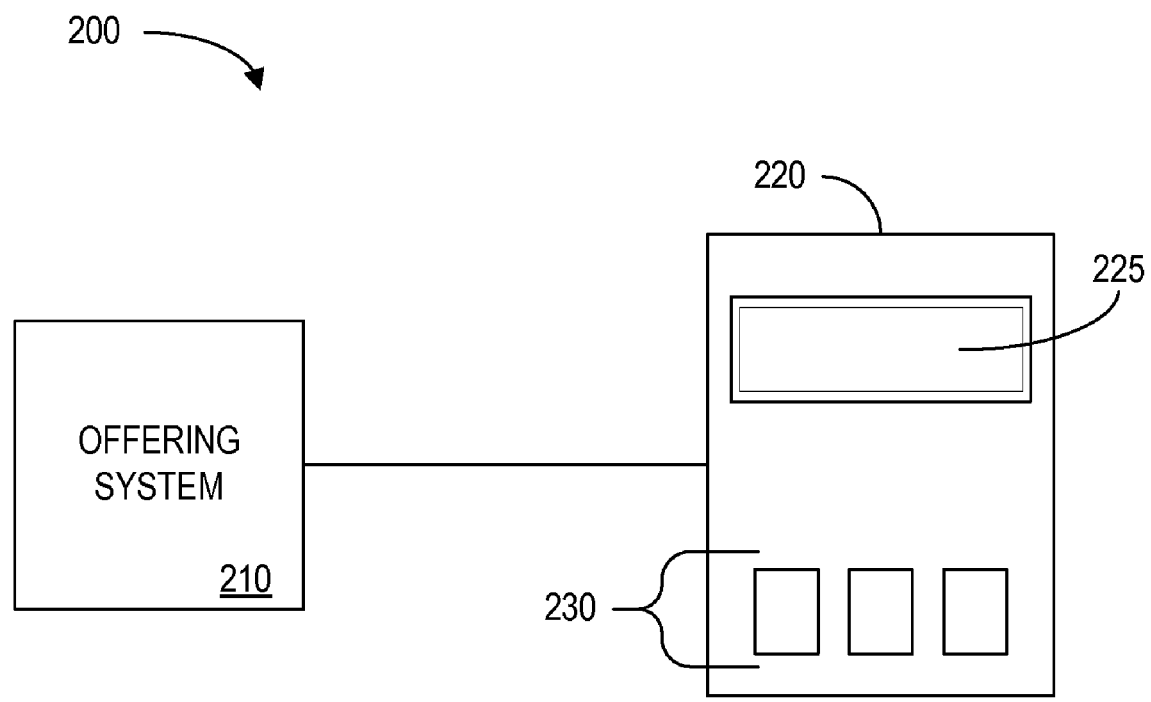
FIG. 2 is a schematic illustration of an embodiment of the invention in which vouchers may be offered in a vehicle such as a taxicab.

FIG. 2 illustrates an embodiment of the invention in which vouchers may be offered in a vehicle such as a taxicab. A system 200 includes an offering system 210 which performs functions described herein. The offering system 210 may be implemented as the system 100 of FIG. 1, but need not be.

A meter system 220 is in communication with the offering system 210. The meter system 220 may be any of a variety of known devices for use in taxicabs as well as in other vehicles that provide transportation services. Such devices are used to determine and display fares charged to passengers based on various factors, such as miles traveled and/or elapsed time of travel. The meter system includes a region 225 in which the current fare is displayed, and buttons 230 which may be used to direct the meter system 220. For example, the buttons 230 may be used to identify the start of a ride of a passenger, and to identify the stop of the ride. The meter system 220 may transmit to the offering system 210 an indication of the fare due from a passenger, and/or other data such as the current time and distance traveled.

The meter system 220 is typically a device mounted or attached to the dashboard of the taxicab. Similarly, the offering system 210 or a portion thereof may be attached to a part of the interior of a vehicle. For example, the offering system 210 may be attached (e.g., to the dashboard of the vehicle) by using brackets, screws and/or any other well known means for attaching.

The offering system or a portion thereof may be attached in any other location desirable. For example, the offering system may be attached to the back of a front seat, or integral with the back of the seat, allowing a person in the back to view the display and receive receipts from the printer. Of course other portions of the offering system may be located elsewhere even if the printer and display to be attached to the back of a front seat.

Although depicted as separate devices, the meter system 220 and the offering system 210 may be a single device, or more than two devices.

Figure 3:
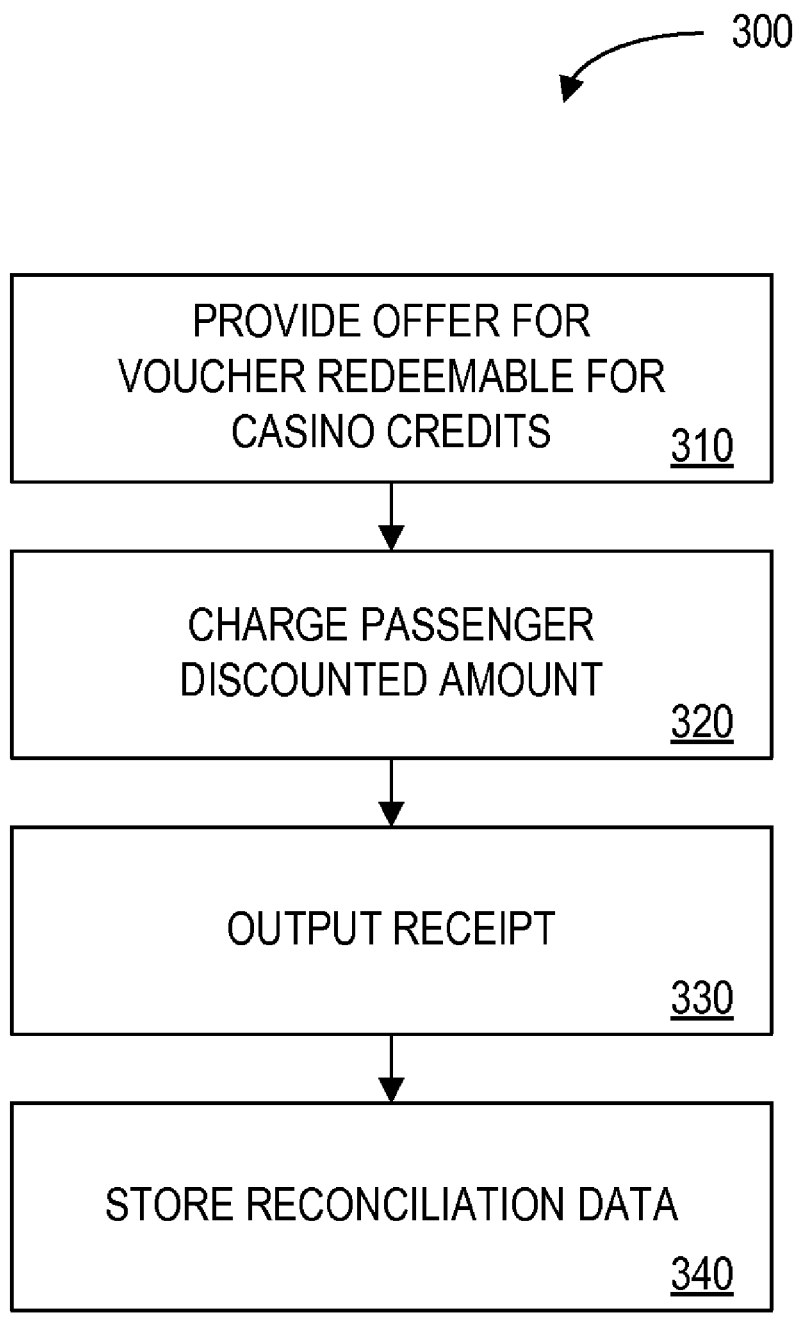
FIG. 3 is a flowchart illustrating a process that may be performed with an offering system.

Referring now to FIG. 3, a flowchart 300 illustrates a process that may be performed with an offering system or with the system 200 of FIG. 2.

The system 200 provides an offer for a voucher which is redeemable for casino credits (step 310). Such an offer may be provided in many ways. For example, display 115 (FIG. 1) may be driven by the processor 105 (FIG. 1) to display a message (e.g. text and/or images) to a passenger receiving a ride in a taxicab. Additionally or alternatively, speaker 120 (FIG. 1) may be driven by the processor 105 (FIG. 1) to output an audible message.

The message may be an offer for a voucher which is redeemable for a first value (e.g. $50) of credits but which costs less (e.g. $40). The lower cost thus represents a discount (e.g. $10 or 20%) for the voucher, as defined by the first value (also known as "face value") of credits and the cost of the voucher. The message may include more or less information than illustrated herein.

The offer may be provided in response to initiating the ride in the taxicab. For example, upon initiating the ride, the taxicab driver will typically press a button on the meter system 220 to identify the start of the ride and begin running the meter which tracks the fare for the ride. The meter system 220 may also transmit a signal to the offering system 210 which indicates the start of the ride. The meter system 220, in response, may output the offer, typically a predetermined time (e.g. 45 seconds) after the start of the ride.

In one embodiment, only vouchers for one casino may be offered. In another embodiment, a casino is selected from a plurality of casinos (e.g. stored in memory) and a voucher for the selected casino is offered. The selected casino may be randomly selected from a plurality of casinos. Alternatively, the selected casino may be indicated by the passenger. For example, the passenger or driver may use the input device 130 of FIG. 1 (e.g. press an area of a touch screen) to indicate a casino, and the input device 130 transmits a signal representing the selection to the processor 105 (FIG. 1).

Alternatively, the casino may be selected based on the location of the taxicab. For example, the offering system 210 (FIG. 2) may include, or be in communication with, a positioning device which permits the location or approximate location to be determined. For example, a GPS (Global Positioning System) device is capable of receiving signals from one or more satellites and determining therefrom its position on the Earth's surface to within a maximum distance. The offering system 210 may include or be in communication with a GPS device.

One or more casinos which are relatively close to the taxicab at the time of the offer may be selected. Casinos may be considered relatively close if they are within a predetermined distance (e.g. two miles) or if they are the closest (e.g. the three closest, the closest) relative to other casinos. If more than one casino is relatively close, the passenger may be prompted (e.g. via a message) to select (e.g. using the input device) one casino to receive a voucher for. Alternatively, if more than one casino is relatively close, one may be selected at random.

Alternatively, the casino may be selected based on characteristics of the passenger. For example, the offering system 210 (FIG. 2) and/or the driver may determine characteristics of the passenger and use those characteristics to select a casino and/or voucher. In one embodiment, the taxicab driver could select a more expensive casino if the passenger is well dressed.

The first value (e.g. $50) of credits for which the voucher is redeemable may be selected from a set of values. In one embodiment, the first value may be determined by the passenger. For example, the passenger may use the input device 130 (FIG. 1) to select a dollar amount from a set of dollar amounts displayed on the display 115 (FIG. 1), or the passenger may use the input device 130 to type in digits which represent a dollar value the passenger desires. The passenger may likewise direct another (e.g. the driver of the taxicab) to use the input device 130 to enter the first value. The first value may be determined by the driver as well. For example, the driver may decide a dollar amount to offer to the passenger.

The discount may be determined, and the cost of the voucher may be calculated based on the discount. The discount may be fixed, or may be specific to each type of voucher. For example, different casinos may correspond to different discounts (e.g. casino X has 5% discount, casino Y has $10 discount). Additionally or alternatively, different face values may correspond to different discounts (e.g. over $50 face value has 10% discount, otherwise have 5% discount).

Alternatively, the cost of the voucher may be determined, and the discount may be calculated based on the cost.

The passenger may indicate acceptance of the offer using the input device 130 (FIG. 1), such as by pressing an area of a touch screen which graphically displays an "ACCEPT" button. Alternatively, the passenger may indicate acceptance of the offer verbally, and the driver may then use the input device to indicate acceptance.

The passenger is charged the (discounted) cost of the voucher. The passenger may in some embodiments be charged a reduced price for the ride. The meter system 220 (FIG. 2) may, at the end of the ride, transmit to the offering system 210 (FIG. 2) data representing the normal price for the ride.

The offering system may, in turn, determine a reduction to apply to the normal price for the ride, and the passenger may even receive the ride at no charge. In one embodiment, the offering system 210 may determine the reduction based on the discount in the price of the voucher. For example, a lesser discount in the price of the voucher may prompt the offering system to determine a greater reduction in the price for the ride. In one embodiment, the offering system 210 may determine that the passenger is to be charged nothing for the ride if the normal price is below a predetermined price. For example, rides costing less than $12 may be given for free. In one embodiment, the offering system 210 may determine an amount which the casino will reimburse for the ride. Such an amount may be deducted from the price of the ride, and the casino charged accordingly.

The offering system 210 may determine a difference between the normal price and the reduced price of the ride, and use this information for purposes of accounting, reconciliation and/or passenger receipts.

At step 320, the passenger is charged the discounted amount for the voucher. The offering system 210 may record the discounted amount as due, and payment in accordance with the amount due will be expected to have been collected. Thus, if cash payment for the voucher is received from the passenger by the driver, that amount will be known and the driver will be expected to turn over that amount. Payment may also be rendered via credit card. For example, the credit card reader 135 (FIG. 1) may be used to read a credit card identifier from a credit card and process payment therefrom in a manner known in the art.

In one embodiment, the passenger may pay for the voucher at two or more stages. For example, the passenger may pay a portion to a taxicab driver (e.g., $5) to acquire a receipt which represents a voucher (e.g., face value $50), but the receipt itself must then be redeemed for credits (in any form such as tokens, cash or a cashless gaming voucher) by paying an additional amount (e.g., $40). Thus, the receipt received from the taxicab driver (e.g., for $5) represents the right to purchase credits (e.g., $50 in credits) for a discount (e.g., $40 more). In accordance with such an embodiment, vouchers may represent "options" to purchase (at a discount) credits at a casino.

At step 330, a receipt is output. For example, the printer 125 (FIG. 1) may print indicia onto a substrate (e.g. rigid or flexible paper). Such indicia may represent any or all of the following: the face value of the voucher, the casino at which the voucher may be redeemed, an identifier that identifies the voucher, and an identifier that identifies the taxicab. An identifier that identifies the voucher may be determined by the offering system 210 (FIG. 2), and may be a unique identifier such that the offering system 210 does not provide the same identifier for two or more different vouchers. The identifier may be used as a key in a database so that the face value of the voucher is associated with, and may be determined from, the identifier. Methods for determining unique identifiers are well known. The identifier may be, for example, a sequence of alphanumeric characters generated according to an algorithm or retrieved from a list of predetermined identifiers. The identifier may be printed in the form of a machine-readable bar code in a manner known in the art.

An example of a database which may store data regarding vouchers is illustrated by the data shown in Table 1 below. The data and the number of entries are purely for illustration. Many different types of data, arrangements of data, and number of entries may be included, in one or more databases.

TABLE 1

Data in Voucher Database

| IDENTIFIER | FACE VALUE | CASINO | COST | SELLER |
|---|---|---|---|---|
| VV123 | $50 | Tropicana | $40 | Taxicab #2 |
| VV555 | $100 | Tropicana | $75 | Restaurant #82 |

The substrate may be blank or preprinted with various other indicia or other features such as holograms. Similarly, the substrate may include the preprinted indicia representing any or all of the following: the face value of the voucher, the casino at which the voucher may be redeemed, an identifier that identifies the voucher, and an identifier that identifies the taxicab.

The substrate may also include one or more areas where the driver of the taxicab (or other seller of the voucher) could sign, thereby verifying that he was the seller. Compensation may thereby be verified as due.

Instead of or in addition to a printed voucher, the casino may be informed of the voucher. For example, the offering system 210 (FIG. 2) may wirelessly transmit a signal to a remote server that stores casino data. Such a signal may represent any or all of the information (e.g. face value of the voucher) which is described above as being on a receipt or substrate. Further, a personal identifier or security code associated with the voucher may be output. Such a personal identifier or security code may be used to prevent unauthorized people from redeeming the voucher. The personal identifier or security code may be generated by the offering system 210 and provided to the user. Alternatively, the personal identifier or security code may be received form the passenger (e.g. via the input device 130 of FIG. 1).

Similarly, the offering system 210 (FIG. 2) may wirelessly transmit or transmit via physical connection the signal to a device such as a hand-held computer, PDA, cell phone or other device capable of storing data representing any or all of the information (e.g. face value of the voucher) which is described above as being on a receipt or substrate. The device could then be brought to a casino, and the data stored thereon could be used to initiate redemption. For example, data representing a voucher identifier may be transmitted via infrared signal to PDA of a passenger. The PDA stores the voucher identifier, and the PDA can transmit the voucher identifier to a device at the casino used in redeeming vouchers. The voucher identifier received from the PDA is compared to voucher identifiers stored by a server that stores casino data. The face value of the voucher, any restrictions, etc. may thereby be determined.

At step 340, the offering system 210 (FIG. 2) stores and/or outputs reconciliation data to permit compensation, which is typically due from the casino for which the voucher was sold. Reconciliation is described in detail below.

Notwithstanding the above examples which illustrates some embodiments of the present invention, vouchers may be offered and sold in other areas besides in taxicabs. Similarly, the person may optionally be charged a reduced price for the product.

For example, a voucher may be offered to a person purchasing a product, e.g. at a physical store or via a Web site. In one embodiment, a POS terminal in a physical store may be programmed to perform some or all of the functions of the offering system 210 of FIG. 2. Similarly, a POS terminal in a physical store may be in communication with a device that performs some or all of the functions of the offering system 210 of FIG. 2.

Vouchers may be offered via a Web page that receives requests to purchase a product (e.g. a Web page used in selling airline tickets). A message may be displayed on the Web page, such as in a frame, banner advertisement or pop-up window. The message can, as described herein, offer a voucher which is redeemable for credits at a casino.

A request to purchase the voucher may be received by the Web page in a manner known in the art (e.g. when the user manipulates controls of a web browser viewing the Web page). The user may then be charged for the voucher, and the product may also be sold at a reduced price (e.g. for free).

Vouchers may also be sold by gaming devices, such as slot machines, video blackjack machines and video poker machines. In such an embodiment, the voucher may be used as a payout of the gaming device.

A gaming device receives a command to wager in a game in any of a number of known ways (e.g. a player inserts currency into a slot machine and presses a "BET MAX" button). The gaming device then generates an outcome for the game (e.g. spins each of three reels to a position) and determines a payout based on the outcome (e.g. double the amount wagered).

The gaming device may then offer, as a payout, to sell a voucher which may be redeemed for a face value of credits. The voucher is offered for a reduced purchase price (i.e. less than the face value). The face value may be the payout amount, and thus the purchase price of the voucher would be less than the payout amount. Alternatively, the purchase price of the voucher may be the payout amount, and thus the face value of the voucher would be more than the payout amount.

The player indicates acceptance by, e.g. pressing a button or an area of a touch screen. In response the gaming device outputs a receipt that represents the voucher, and that includes indicia indicating the face value. Those of ordinary skill in the art readily understand that gaming devices may include printers such as printers that print "cashless gaming vouchers" and the like. Such printers may readily be used in accordance with the embodiments described herein.

Vouchers may similarly be used as payout of games, such as roulette games, which are not played on gaming devices.

Vouchers may also be sold, e.g. in restaurants, on airplanes, by ATM and point of sale terminals, in a variety of manners that will be apparent to those of ordinary skill in the art based on the present disclosure.

Vouchers may be used to promote demand for certain products by offering to sell the vouchers in conjunction with those products. For example, if a customer desires to purchase a first product, that customer may be offered a second product and a voucher for credits at a casino. Provided the price of the second product and voucher is attractive, the offer may prompt the customer to purchase the second product (and voucher) rather than the first product.

In one embodiment, an airline may use revenue management techniques in conjunction with offers for vouchers to shape demand for airline tickets in a desired manner. Revenue management techniques are well known and widely practiced by airlines in setting prices for airline tickets. For example, less popular air routes are typically associated with lower prices in an attempt to maximize profits.

In an embodiment where airline tickets are sold online, a Web page that receives requests to purchase airline tickets may receive data representing a first airline ticket that is requested by a purchaser. In response, the web server displaying the page, or a computer in communication therewith, can determine a value of selling a second airline ticket instead of the first airline ticket. For example, the first airline ticket may represent a flight that is full or likely to sell for full price in the future, and/or the second airline ticket may represent a flight that is unlikely to sell or is likely to sell for a low price in the future. The value of selling the second airline ticket in lieu of the first might be represented as an expected increase in profit (e.g. $40).

To be an acceptable substitute for the first airline ticket, the first and second airline ticket should have the same destination. In various circumstances, the same destination may be relatively limited (e.g. same airport, same city, same general time). In other circumstances, the same destination may be relatively flexible or broad in scope (e.g. same geographic area such as metropolitan New York area, same week).

The web server or other computer determines, based on the value, a discount for a voucher which is redeemable for credits at a casino, as described herein. The discount, together with the face value of the voucher, define a discount value that may be charged for the voucher. Then, the Web page provides the purchaser with an offer for the second airline ticket and the voucher instead of the first airline ticket. If the purchaser transmits an acceptance of the offer, then the passenger is charged for second airline ticket and the voucher.

Reconciliation

Figure 4:
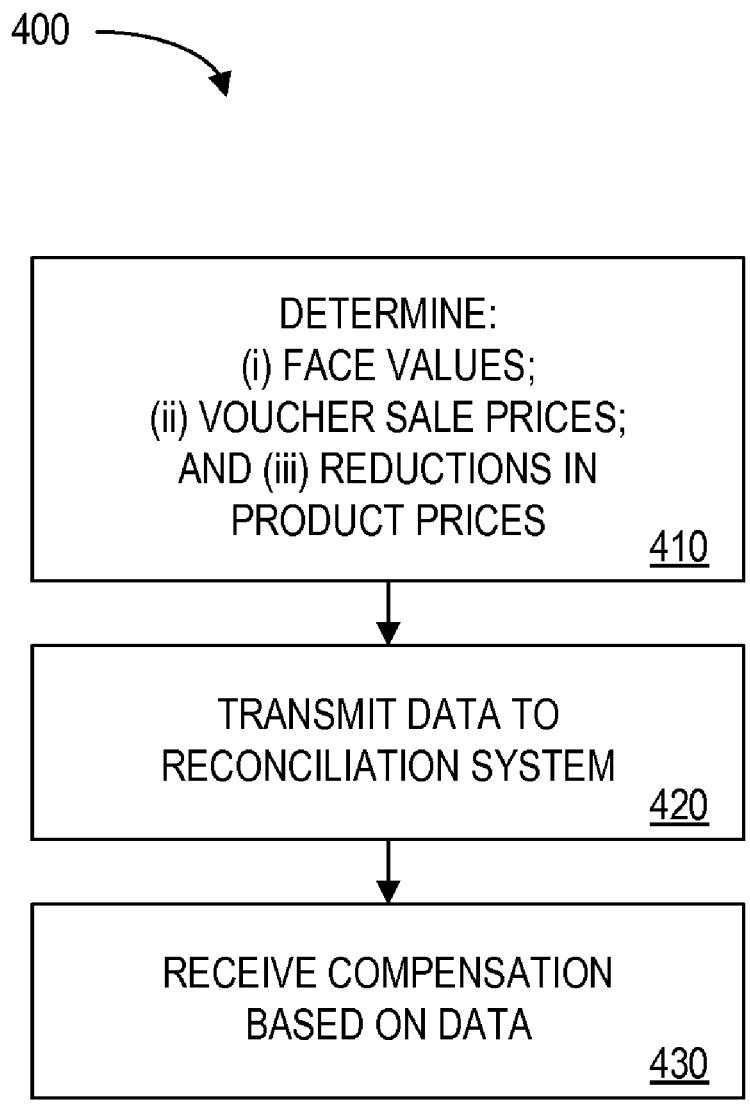
FIG. 4 is a flowchart illustrating another process that may be performed with an offering system.

Referring to FIG. 4, a flow chart 400 illustrates a process that may be performed with an offering system or with the system 200 of FIG. 2.

At step 410 the system 200 determines, for a plurality of vouchers sold, various sums. It may determine (i) a first sum of respective values for which each voucher may be redeemed; (ii) a second sum of respective values for which each voucher was sold, and/or (iii) a third sum of respective reductions in price of products sold with each voucher.

In one embodiment the offering system 210 (FIG. 2) adds the price charged for the voucher to an aggregate amount that represents previous charges for such vouchers. The offering system 210 may also track prices charged by casino, if vouchers for more than one casino may be sold.

Further, if a reduced price was charged for the taxicab ride, the offering system 210 determines a difference between the normal price and the reduced price. That difference is similarly added to an aggregate amount that represents previous differences between normal prices for rides and reduced prices charged for rides. The offering system 210 may also track differences by casino, if vouchers for more than one casino may be sold.

At step 420 the offering system 210 outputs data representing the above-described sums. The data may be output in printed form (e.g. on a substrate), via wire (e.g. via a serial port connection to or other communication with the offering system 210) or wirelessly (e.g. to a remote server). Instead of or in addition to the aggregate amount(s), the offering system 210 may output data detailing each transaction (e.g. face value of voucher, discounted cost of voucher, difference between the normal price of ride and the reduced price).

In various embodiments, the individual values, such as values for which vouchers were redeemable, values for which vouchers were sold, and reductions in price of products sold with each voucher may be output in addition to or instead of the sums described above. Various other forms of data may be output besides the particular data described with respect to FIG. 4.

At step 430, compensation is received in response to the output data. For example, an account of the driver or taxicab company may be credited accordingly. The compensation amount may be based on any or all of the above-described sums. For example, the compensation may be exactly equal to (i) the reductions in prices of products (e.g., taxicab rides) sold, plus (ii) the difference in sums of the face values and sums of voucher sales prices. In another embodiment, the compensation may be based on a portion of the sum of the face values. For example, compensation may be based on a fixed percentage (e.g., 5%) of the face value of vouchers sold.

Voucher Use

Generally, vouchers may be redeemed for credits at a casino. For example, a player may redeem a voucher at a cashier's window or device in a casino, and be provided with an appropriate number of tokens or chips.

When a voucher is sold for an amount smaller than the face value of the voucher, it can be advantageous to prevent exploitation. For example, in many circumstances a casino would not desire to sell such a voucher at a reduced price (e.g., $40) only to have the voucher be redeemed for its face value (e.g., $50), which is greater than the price for which the voucher was sold. Accordingly, it can be advantageous in some circumstances to employ methods to assure (or at least increase the likelihood) that the vouchers are used in certain manners.

In one embodiment, there may be restrictions on who may be provided with vouchers. For example, people with certain identities (e.g., people that live relatively near the casino, people that are friends of people that provide vouchers) may be restricted from receiving vouchers. Accordingly, during redemption of a voucher some form of identification (e.g., a driver's license) may be required. If the identifier reveals a person that is restricted from receiving vouchers, redemption is not permitted.

In one embodiment, a casino may desire that such vouchers be used in a minimum amount of game play.

Figure 5:
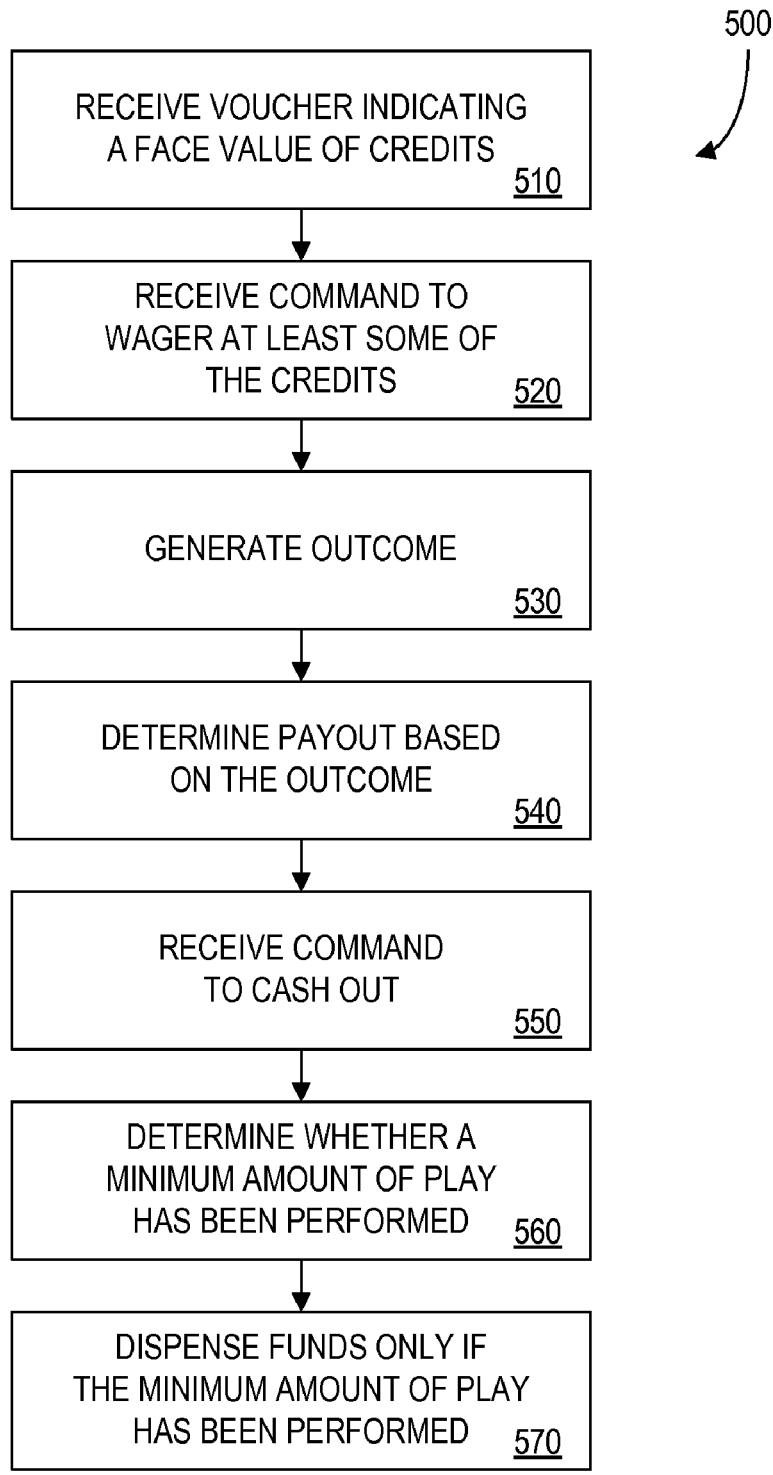
FIG. 5 is a flowchart illustrating another process that may be performed with a gaming device.

Referring to FIG. 5, a flow chart 500 illustrates a process that may be performed by a gaming device, such as a slot machine. At step 510 the gaming device receives a voucher indicating a face value of credits. For example, the gaming device may have a cashless gaming reader which reads bar codes registered on paper or other material inserted into the reader, in a manner known in the art. Thus receipts and other material with, e.g., printed bar codes thereon, may be read by the gaming device.

From the voucher the gaming device may register a balance, as when currency or tokens are deposited in the gaming device. A player may then command the gaming device to wager at least some of the value in a game (step 520). As is known in the art, a player may indicate a wager amount and a command to play a game by, e.g., pressing one or more buttons or areas on a touch screen of the gaming device, and/or pulling a handle.

In response the gaming device generates an outcome in a known manner (step 530). For example, a slot machine may determine an outcome (e.g., losing outcome, winning outcome of a certain type) and command reels to move to (or be displayed at) appropriate positions. The gaming device determines a payout for the game base on the outcome (step 540) in a manner known in the art. Payouts (typically only when the outcome is not a losing outcome) are usually based on or proportional to the amount wagered.

As is known in the art, the player may then command the gaming device to cash out (step 550) after zero or more plays. Typically, the player commands the gaming device to cash out by pressing a predetermined "CASH OUT" button or a pre-determined area of a touch screen. Conventionally, this command drives the gaming device to disburse the entire balance of the gaming device (e.g., in cash, in tokens, as a cashless gaming receipt). However, in accordance with this embodiment, the gaming device determines whether at least a minimum amount of play has been performed (step 560) and only dispenses funds if at least a minimum amount of play has been performed (step 570).

Minimum amount of play may be defined in any of a number of ways apparent to those skilled in the art. Many different forms of minimum amounts of play will be desirable to different entities. For example, it may be desirable for the gaming device to determine whether at least a minimum amount has been wagered since receiving the voucher. In such an embodiment, the gaming device may, after receiving a receipt indicating a voucher for credits, begin tracking the amounts wagered on each play of the game. Only after a predetermined minimum amount of wagers will cash out be permitted.

Similarly, it may be desirable for the gaming device to determine whether at least a minimum amount of time has passed since receiving the voucher. In such an embodiment, the gaming device may, after receiving a receipt indicating a voucher for credits, begin tracking the time passed with reference to an internal clock or other device the gaming device may use to track elapsed time. Only after a predetermined minimum amount of time will cash out be permitted.

Similarly, it may be desirable for the gaming device to determine whether at least a minimum number of plays have been played since receiving the voucher. In such an embodiment, the gaming device may, after receiving a receipt indicating a voucher for credits, begin tracking the number of plays or the number of plays in which a minimum amount was wagered. Only after a predetermined minimum number of acceptable plays will cash out be permitted.

Similarly, it may be desirable, in a table game, to assure that vouchers are redeemed for certain types of chips or other credits. For example, a voucher might be redeemable only for a "non-negotiable chip" which is of a different color that typical or which bears certain identifiable markings (e.g., "NON NEGOTIABLE"). If such non-negotiable chips are not redeemable for cash, then the voucher is effectively redeemed for chips that may not be cashed in themselves, restricting use of such vouchers. Of course winnings resulting from wagering such non-negotiable chips could be redeemed for cash. Other types of non-negotiable chips include chips which include microchips or other means for transmitting wireless signals identifying the chips, or magnetic chips.

Besides minimum amount of play, vouchers may carry other restrictions, such as restrictions regarding machines or games certain vouchers may be used with, or dates and times when the voucher may be redeemed, or dates and times when credits from a voucher may be redeemed.

An example of a database which may store data regarding vouchers and restrictions is illustrated by the data shown in Table 2 below. The data shown here may be related to the data illustrated in Table 1.

The data and the number of entries are purely for illustration. Many different types of data, arrangements of data, and number of entries may be included, in one or more databases.

TABLE 2

Data in Voucher Database

| IDENTIFIER | RESTRICTIONS |
|---|---|
| VV123 | Play at least one hour |
| VV555 | Wager at least $100 |

Compensation

The disclosed methods and apparatus for providing vouchers redeemable for credits can be employed to provide vouchers from a plurality of different entities, such as a plurality of different casinos. Further, an entity offering such vouchers may decide which voucher(s) to offer based on the compensation the entity will receive from, e.g., the corresponding casinos.

Figure 6:
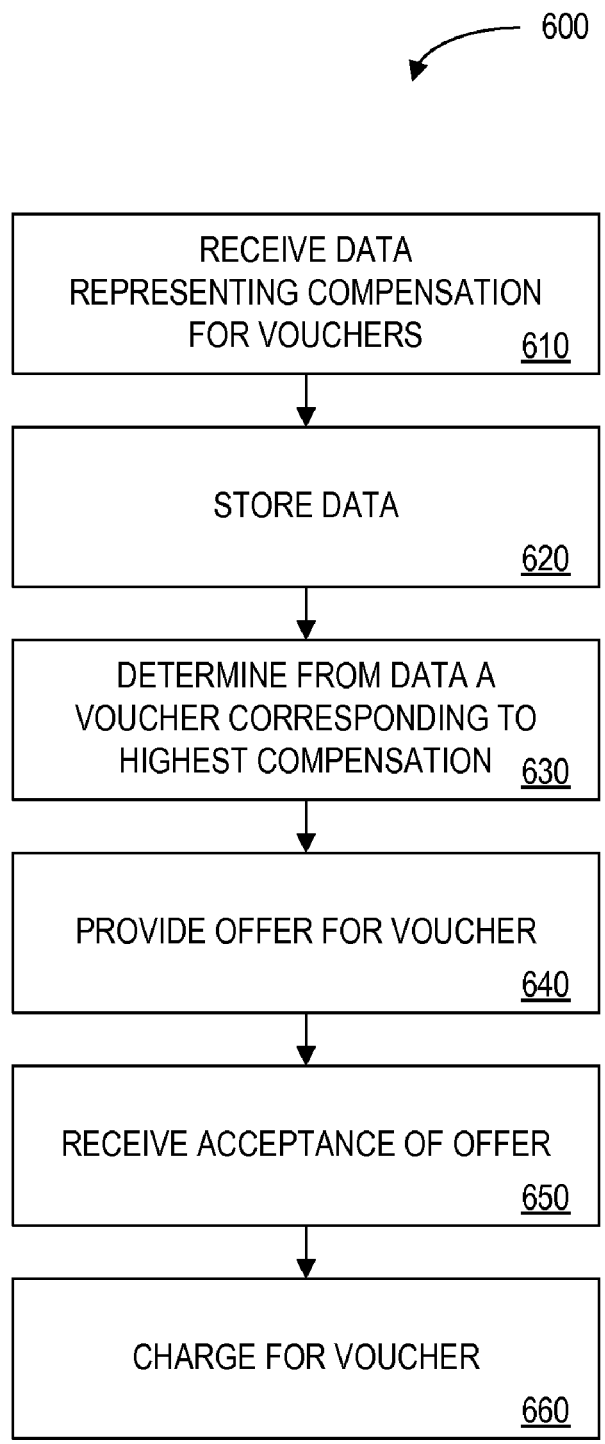
FIG. 6 is a flowchart illustrating another process that may be performed with an offering system.

FIG. 6 is a flowchart illustrating another process that may be performed with an offering system or with the system of FIG. 2. At step 610, the system receives data which represents, for each of a plurality of casinos, compensation in exchange for a sale of a respective voucher for the respective casino. The data is stored on an accessible computer-readable medium (step 620).

The data may define, for at least one casino, a plurality of compensations. Each of these compensations may corresponds to a sale of a respective voucher for the respective casino under a respective condition. For example, a particular casino (or other entity) may provide different compensation for different value vouchers, and/or for vouchers sold or offered to customers in a taxicab at different locations.

The data may be downloaded into its memory from a computer. For example, a server computer of a taxicab company may receive the data (e.g., from a remote connection with various casinos) and download it to a plurality of offering systems in a plurality of taxicabs. Similarly, a server computer of a retailer may receive the data and download it to a plurality of POS terminals and/or store terminals of various affiliated retail stores. Similarly, a server computer of an airline may receive the data from a remote connection with various casinos.

A wide variety of forms of compensation may be employed, and will be readily apparent to those skilled in the art. For example, compensation may comprise a predetermined amount for a sale of a voucher, or a predetermined amount for offering a voucher. Similarly, compensation may be an amount based on (i) the amount of credits for which the selected voucher may be redeemed, and/or (ii) a geographic area in which offers for the respective casino may be provided. For example, compensation may be $2 per voucher offered while on Main Street, but only $1 per voucher offered on other streets.

Compensation may also include a fixed component as well as a component based on offers or sales of vouchers. For example, a casino may pay $100 per month, and may also pay some amount for each offer and/or sale of a voucher.

At step 630, the system determines, from the data, a selected voucher which corresponds to the highest compensation receivable. For example, under the current conditions of a particular taxicab ride including, e.g., the location of the taxicab, an offering system in the taxicab may determine that the highest compensation to be received would be in exchange for selling a $50 voucher for casino X.

According to this determination, at step 640 an offer for the selected voucher is provided, as described herein. If the offer is accepted (step 650) then the reduced price is charged for the selected voucher (step 660) as described herein.

Although the present invention has been described with respect to a preferred embodiment thereof, those skilled in the art will note that various substitutions may be made to those embodiments described herein without departing from the spirit and scope of the present invention.

For example, the voucher is described as being redeemable for credits, but could alternatively or in addition be redeemable for free plays, improved odds at a game, higher top jackpot wins, or other benefits, including but not limited to gambling specific benefits.

For example, rather than, e.g., printed receipt, a receiver of a voucher might receive actual casino chips or tokens.

The above are several examples which illustrate various embodiments of the present invention. These examples do not constitute a definition of all possible embodiments, and those skilled in the art will understand that the present invention is applicable to many other embodiments. Further, those skilled in the art will understand how to make any changes, if necessary, to the above-described apparatus and methods to accommodate other embodiments and applications.

The particular arrangement of elements in the flow charts described herein is not meant to imply a fixed order to the steps; embodiments of the present invention can be practiced in any order that is practicable.

Any number of devices and components may be included in the various systems and products described herein.

Communication between devices and/or component described herein may be direct or indirect, such as over the Internet, a Web site, over an on-line data network including commercial on-line service providers, bulletin board systems and the like, over RF (radio frequency), cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

Any of the described devices may comprise, e.g., conventional personal computers, portable types of computers, such as a laptop computer, a palm-top computer, a hand-held computer, or a Personal Digital Assistant (PDA) appropriately programmed to perform functions described herein. The devices may also comprise dedicated hardware circuits or any other equivalent electronic, mechanical or electro-mechanical device.

What is claimed is:

1. A method comprising:
    displaying a message to a passenger receiving a ride in a transportation vehicle, the message including an offer for a voucher which is redeemable at a casino for a first value of credits;
    if the passenger accepts the offer for the voucher, charging the passenger a second value for the voucher and not charging the passenger for the ride, the second value being less than the first value, the first value and the second value defining a discount for the voucher; and
    if the passenger does not accept the offer for the voucher, charging the passenger for the ride.

2. The method of claim 1, which includes, if the passenger accepts the offer for the voucher, outputting a receipt that represents the voucher, the receipt including indicia indicating the first value and the casino.

3. The method of claim 1, which includes displaying the message to the passenger if the passenger is receiving the ride in the transportation vehicle to a destination other than the casino.

4. The method of claim 3, which includes, if the passenger accepts the offer for the voucher, rerouting the transportation vehicle to the casino.

5. The method of claim 1, which includes determining the casino from a plurality of casinos based on a location of the transportation vehicle.

6. The method of claim 1, which includes enabling the passenger to select the casino from a plurality of casinos.

7. The method of claim 1, which includes enabling the passenger to determine the first value.

8. The method of claim 7, which includes determining the discount based on the determined first value.

9. The method of claim 7, wherein the discount is predetermined, and which includes determining the second value based on the discount.

10. The method of claim 1, which includes displaying the message in response to a request to purchase the voucher.

11. An apparatus comprising:
    at least one display device;
    at least one input device;
    at least one processor; and
    at least one memory device storing a plurality of instructions which, when executed by the at least one processor, cause the at least one processor to operate with the at least one display device and the at least one input device to:
    display a message to a passenger receiving a ride in a transportation vehicle, the message including an offer for a voucher which is redeemable at a casino for a first value of credits;
    enable the passenger to accept the offer for the voucher;
    if the passenger accepts the offer for the voucher, charge the passenger a second value for the voucher and not charge the passenger for the ride, the second value being less than the first value, the first value and the second value defining a discount for the voucher; and
    if the passenger does not accept the offer for the voucher, charge the passenger for the ride.

12. The apparatus of claim 11, which includes a printer, and wherein the plurality of instructions, when executed by the at least one processor, cause the at least one processor to operate with the printer to, if the passenger accepts the offer for the voucher, output a receipt that represents the voucher, the receipt including indicia indicating the first value and the casino.

13. The apparatus of claim 11, wherein the plurality of instructions, when executed by the at least one processor, cause the at least one processor to operate with the at least one display device to display the message to the passenger if the passenger is receiving the ride in the transportation vehicle to a destination other than the casino.

14. The apparatus of claim 13, wherein the plurality of instructions, when executed by the at least one processor, cause the at least one processor to, if the passenger accepts the offer for the voucher, cause the transportation vehicle to be rerouted to the casino.

15. The apparatus of claim 11, wherein the plurality of instructions, when executed by the at least one processor, cause the at least one processor to determine the casino from a plurality of casinos based on a location of the transportation vehicle.

16. The apparatus of claim 11, wherein the plurality of instructions, when executed by the at least one processor, cause the at least one processor to operate with the at least one input device to enable the passenger to select the casino from a plurality of casinos.

17. The apparatus of claim 11, wherein the plurality of instructions, when executed by the at least one processor, cause the at least one processor to operate with the at least one input device to enable the passenger to determine the first value.

18. The apparatus of claim 17, wherein the plurality of instructions, when executed by the at least one processor, cause the at least one processor to determine the discount based on the determined first value.

19. The apparatus of claim 17, wherein the discount is predetermined, and wherein the plurality of instructions, when executed by the at least one processor, cause the at least one processor to determine the second value based on the discount.

20. The apparatus of claim 11, wherein the plurality of instructions, when executed by the at least one processor, cause the at least one processor to operate with the at least one display device to display the message in response to a request to purchase the voucher.

* * * * *